United States Patent
Jung et al.

(10) Patent No.: US 7,315,247 B2
(45) Date of Patent: Jan. 1, 2008

(54) REFRIGERATOR HAVING IMPROVED RECOGNITION RATE OF RFID TAG

(75) Inventors: Woon Sung Jung, Suwon-Si (KR); Hoon Kim, Suwon-Si (KR); Chang Ho Son, Suwon-Si (KR); You Na Park, Seoul (KR); Hye Rim Lee, Suwon-Si (KR)

(73) Assignee: Samsung Electronics Co., Ltd., Suwon (KR)

( * ) Notice: Subject to any disclaimer, the term of this patent is extended or adjusted under 35 U.S.C. 154(b) by 224 days.

(21) Appl. No.: 11/121,922

(22) Filed: May 5, 2005

(65) Prior Publication Data

US 2006/0125639 A1    Jun. 15, 2006

(30) Foreign Application Priority Data

Nov. 30, 2004   (KR) ................ 10-2004-0099391

(51) Int. Cl.
*G08B 13/14*   (2006.01)

(52) U.S. Cl. ............... 340/572.7; 340/572.8; 340/572.1

(58) Field of Classification Search ........... 340/572.1, 340/572.2, 572.4, 572.7, 572.8, 568.1, 568.5, 340/568.7, 10.1, 540; 235/381, 385; 700/215, 700/225
See application file for complete search history.

(56) References Cited

U.S. PATENT DOCUMENTS

| 6,669,089 B2 * | 12/2003 | Cybulski et al. ............ 235/385 |
| 6,829,520 B1 * | 12/2004 | Green ........................ 700/225 |
| 6,892,545 B2 * | 5/2005 | Ishikawa et al. ............. 62/126 |
| 6,982,640 B2 * | 1/2006 | Lindsay et al. ............. 340/540 |
| 7,032,818 B2 * | 4/2006 | Thomas et al. ............. 235/381 |
| 7,096,221 B2 * | 8/2006 | Nakano ....................... 707/10 |
| 7,102,519 B2 * | 9/2006 | Lyon et al. ............... 340/572.1 |

FOREIGN PATENT DOCUMENTS

| JP | 2004-144357 A | 5/2004 |
| KR | 10-0459625 B1 | 11/2004 |

* cited by examiner

*Primary Examiner*—Van T. Trieu
(74) *Attorney, Agent, or Firm*—Sughrue Mion, PLLC

(57) ABSTRACT

A refrigerator having improved recognition rate of RFID tags. Antennas of RFID readers are slantingly installed in walls of storage chambers, thereby increasing the recognition rate of the RFID tags attached to foods stored in the storage chambers.

5 Claims, 5 Drawing Sheets

REFRIGERATOR HAVING IMPROVED RECOGNITION RATE OF RFID TAG

CROSS-REFERENCE TO RELATED APPLICATION

This application claims priority from Korean Patent Application No. 2004-99391, filed Nov. 30, 2004, in the Korean Intellectual Property Office, the disclosure of which is incorporated herein by reference.

BACKGROUND OF THE INVENTION

1. Field of the Invention

The present invention relates to a refrigerator having an improved recognition rate of RFID tags and, more particularly, to a refrigerator having an improved recognition rate of RFID tags attached to foods stored in storage chambers.

2. Description of the Related Art

Radio Frequency Identification (RFID) is an automatic recognition technique, which recognizes radio frequency, and generally consists of RFID tags, RFID readers, and a host computer. The above RFID technique is employed by noncontact cards, which substitute for barcodes and magnetic cards, and recently has been used in various fields, such as a distribution field (logistics and storage management) and an industrial field (process management).

In addition to the above-described fields, the RFID technique is used in household electric appliances. For example, the RFID technique is employed in refrigerators. A conventional refrigerator, which is disclosed by Japanese Laid-open Publication No. 2002-81848, comprises RFID readers installed in side walls, i.e., left and right walls, and rear walls of storage chambers, a control device performing a food treatment program for treating stored states of foods contained in the storage chambers, and a display unit installed on the outer wall of the refrigerator. In the above conventional refrigerator, RFID tags attached to the foods and the RFID readers communicate with each other at regular intervals of time so as to check the quantity of the stored foods and to display the obtained quantity of the stored foods using the display unit, thereby allowing a user to frequently check whether or not foods are consumed and/or remain.

That is, each of the RFID readers of the conventional refrigerator has a coil-shaped antenna installed therein. The antennas of the RFID readers generate magnetic lines of a designated frequency so that the magnetic lines of the antennas of the RFID readers interlink with those of coil-shaped antennas of the RFID tags. When the antennas of the RFID tags generate electricity due to the interlinking, the RFID tags transmit data regarding the foods, stored in their memories, to the RFID readers using the generated electricity, thereby communicating with the RFID readers.

In order to prevent the generation of a blind area, in which the RFID tags are not recognized, when the RFID tags attached to the stored foods are recognized by the RFID readers, the conventional refrigerator comprises the RFID readers installed in all walls of the storage chambers, thereby having high production costs. For example, in the case that foods are stored in a refrigerator comprising RFID readers installed only in side walls of storage chambers, when loop planes (inner surfaces formed by the turning of the coil-shaped antennas) of coil-shaped antennas of RFID tags attached to the foods are positioned in parallel with the bottom surfaces of the storage chambers, the loop planes of the coil-shaped antennas of the RFID tags are perpendicular to loop planes of the coil-shaped antennas of the RFID readers. Then, magnetic lines generated from the RFID tags are not interlinked with any of magnetic lines generated from the RFID readers. Thus, the RFID readers cannot recognize the RFID tags. Accordingly, the conventional refrigerator is disadvantageous in that the RFID readers must be installed in upper and lower walls of the storage chambers as well as the side walls of the storage chambers.

SUMMARY OF THE INVENTION

Therefore, an aspect of the invention is to provide a refrigerator having an improved recognition rate of RFID tags so that a small number of RFID readers efficiently recognize the RFID tags.

An apparatus consistent with the present invention provides a refrigerator having an improved recognition rate of RFID tags, comprising: storage chambers; and a plurality of RFID readers, each of which includes an antenna, for receiving data from the RFID tags attached to goods stored in the storage chambers, wherein the antennas of the RFID readers are installed in walls of the storage chambers such that the antennas slant with respect to the walls at a designated angle.

BRIEF DESCRIPTION OF THE DRAWINGS

These and/or other aspects and advantages of the invention will become apparent and more readily appreciated from the following description of the exemplary embodiments, taken in conjunction with the accompanying drawings, in which.

Figure 1:
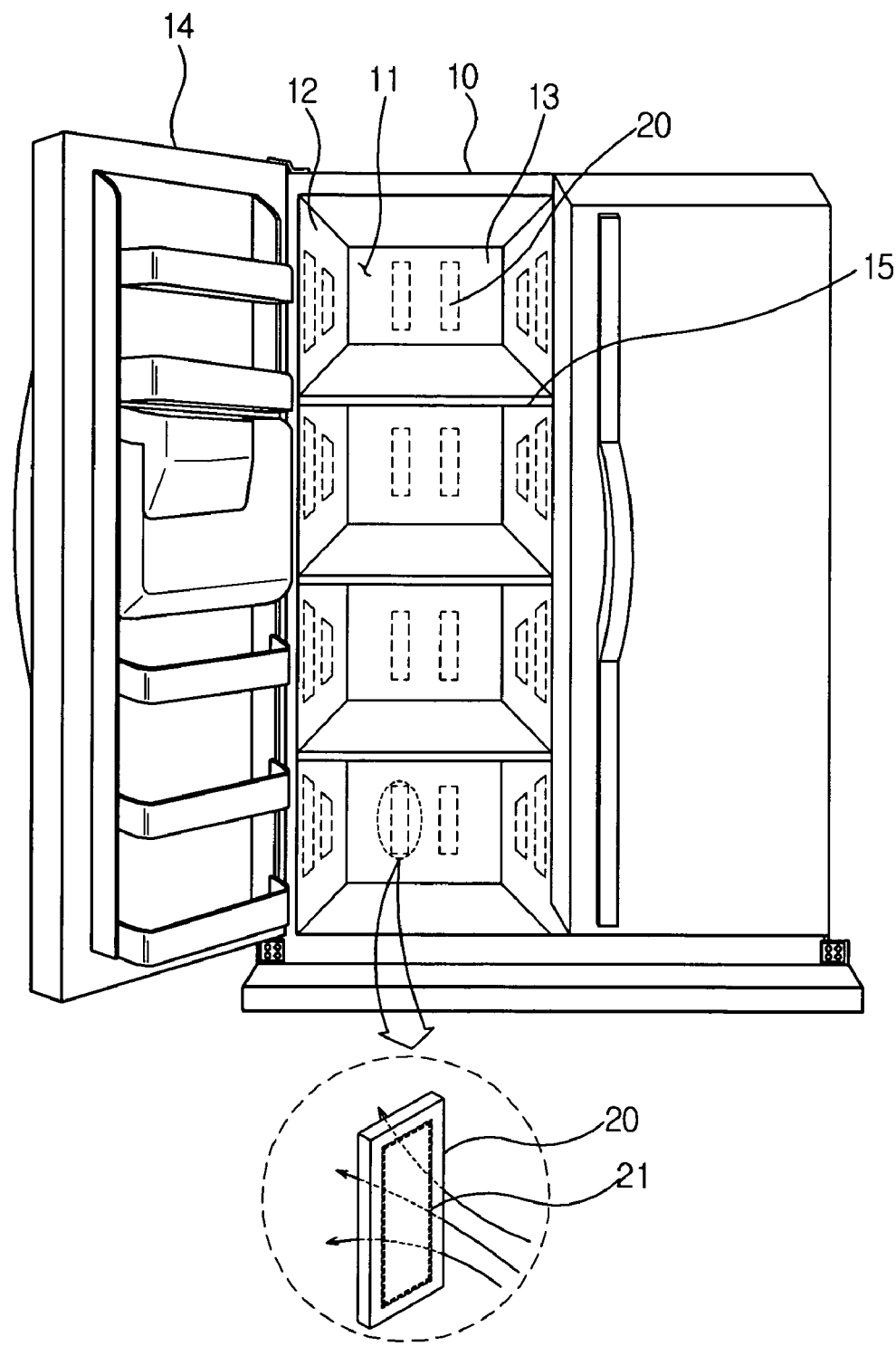
FIG. 1 is a perspective view illustrating the inside of a refrigerator having improved recognition rate of RFID tags in accordance with an exemplary embodiment of the present invention.

DETAILED DESCRIPTION OF THE ILLUSTRATIVE, NON-LIMITING EMBODIMENTS OF THE INVENTION

Reference will now be made in detail to the illustrative, non-limiting embodiment of the present invention, an example of which is illustrated in the accompanying drawings, wherein like reference numerals refer to like elements throughout. The exemplary embodiment is described below to explain the present invention by referring to the accompanying drawings.

Figure 2A:
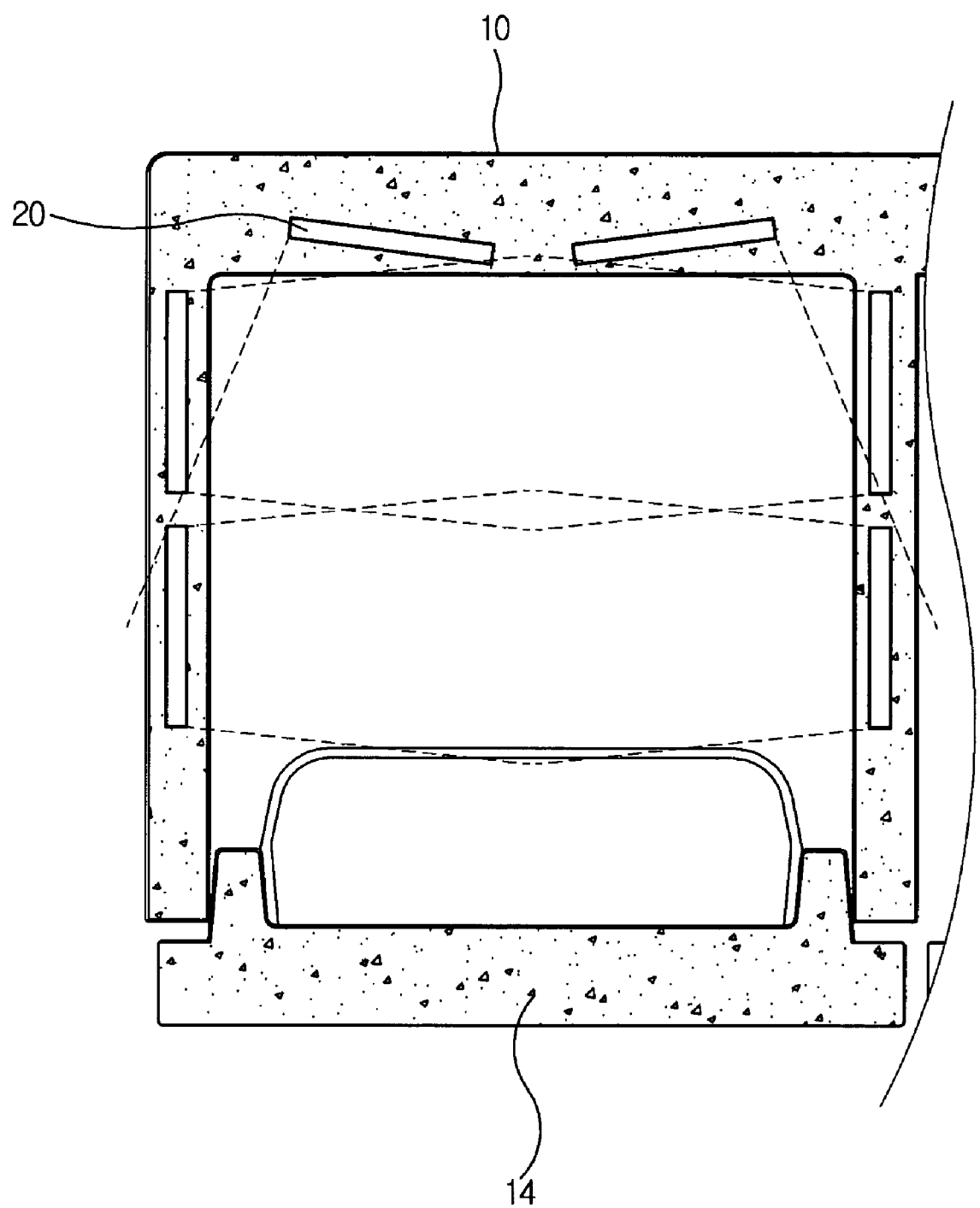
FIGS. 2A and 2B are sectional views illustrating RFID readers slantingly installed in walls of a storage chamber.
Figure 2B:
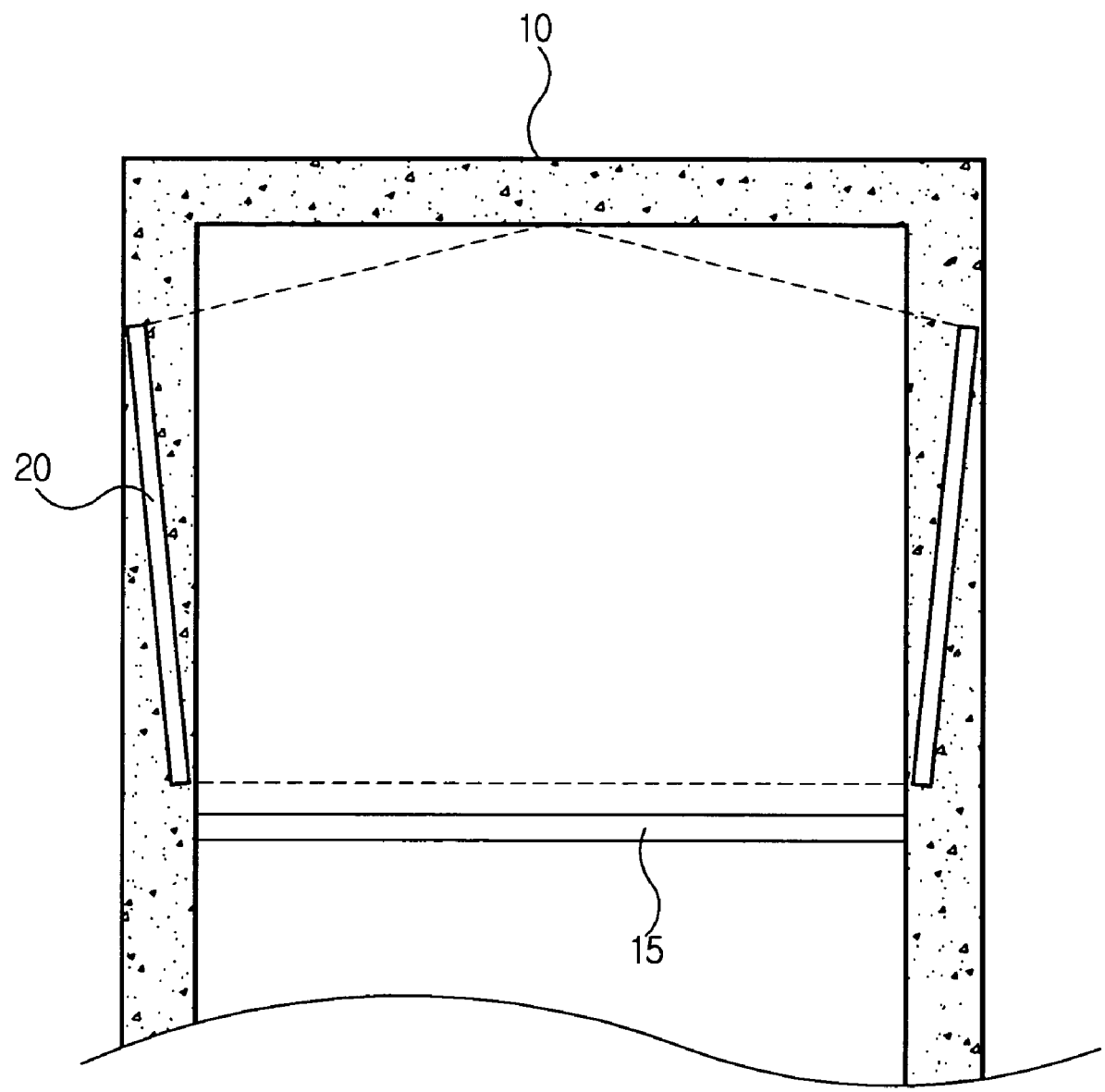
Figure 3:
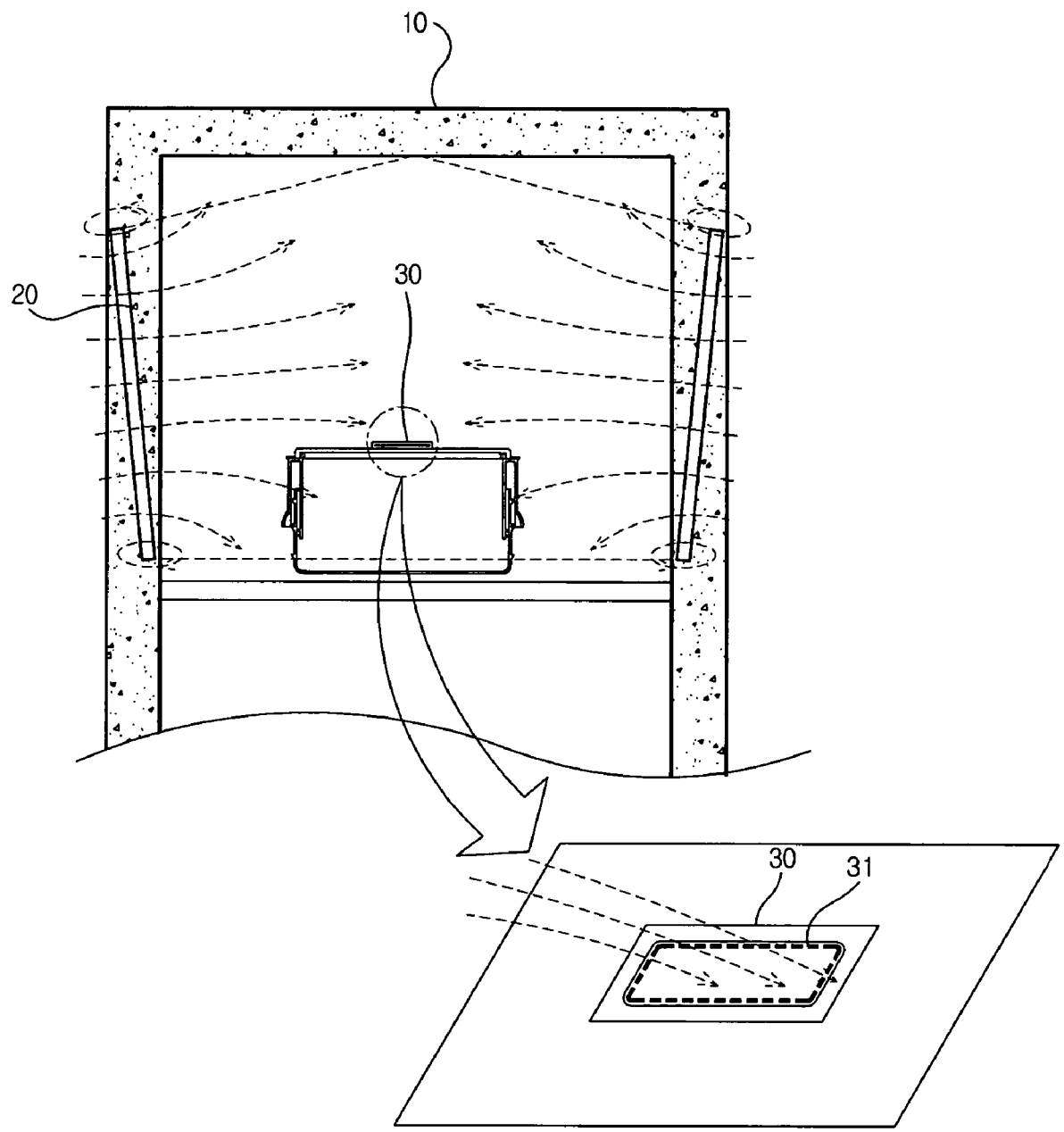
FIG. 3 is a schematic view illustrating operation of the RFID readers for recognizing an RFID tag attached to food.

As shown in FIGS. 1 to 3, a refrigerator having an improved recognition rate of RFID tags consistent with an exemplary embodiment of the present invention comprises a cabinet 10 forming storage chambers 11, and doors 14 hinged to the cabinet 10. The inside of each of the storage chambers 11 is divided into several spaces by racks 15, which are detachably installed in the corresponding storage chamber 11.

As shown in FIGS. 2A and 2B, a plurality of RFID readers 20 are installed in side walls 12 and a rear wall 13 of each of the storage chambers 11. Each of the RFID readers 20 includes a plate-shaped case containing an antenna 21 having a coiled shape. A loop plane of the coiled-shaped antenna 21 is positioned in parallel with a front or rear surface of the case so that magnetic lines pass through the front or rear surface of the case.

Preferably, but not necessarily, as shown in FIG. 2A, the RFID readers 20 installed in the rear wall 13 of the storage chamber 11 slant in a transverse direction. That is, each of the RFID readers 20 is installed in the rear wall 13 of the storage chamber 11 such that a distance between one side part of the RFID reader 20 close to the central part of the storage chamber 11 and the inside of the storage chamber 11 is shorter than a distance between the other side part of the RFID reader 20 and the inside of the storage chamber 11 (see FIG. 2A), or the distance between one side part of the RFID reader 20 close to the central part of the storage chamber 11 and the storage chamber 11 is longer than the distance between the other side part of the RFID reader 20 and the inside of the storage chamber 11.

Further, preferably, but not necessarily as shown in FIG. 2B, the RFID readers 20 installed in the side walls 12 of the storage chamber 11 slant in a longitudinal direction. That is, each of the RFID readers 20 is installed in the side walls 12 of the storage chamber 11 such that a distance between the upper part of the RFID reader 20 and the inside of the storage chamber 11 is shorter than a distance between the lower part of the RFID reader 20 and the inside of the storage chamber 11, or (as shown in FIG. 2B) the distance between the upper part of the RFID reader 20 and the storage chamber 11 is longer than the distance between the lower part of the RFID reader 20 and the inside of the storage chamber 11. As described, in the case that the RFID readers 20 are slantingly installed in the side and rear walls 12 and 13 of the storage chambers 11, the antennas 21 contained in the RFID readers 20 are slantingly installed also.

In the case that the antennas 21 of the RFID readers 20 slant with respect to the side and/or rear walls 12 and 13 of the storage chamber 11, it is possible precisely to recognize an RFID tag 30 (in FIG. 3) attached to food stored in the storage chamber 11 even when the RFID readers 20 are not installed in upper and lower walls of the storage chamber 11.

A plurality of the RFID readers 20, which are slantingly installed, eliminates a blind area in the storage chamber 11, in which the RFID tag 30 is not recognized by the RFID readers 20. That is, when an antenna 31 (in FIG. 3) of the RFID tag 30 is located in parallel with the bottom surface of the storage chamber 11, since the magnetic flux of the RFID readers 20 conventionally installed in the side and rear walls 12 and 13 of the storage chamber 11 does not interlink with the magnetic flux of the RFID tag, it is impossible to recognize the RFID tag 30. Thus, additional RFID readers 20, which are installed in the upper and lower walls of the storage chamber 11, are necessary to solve the above problem. In the present invention, RFID readers 20, which are slantingly installed in the side and/or rear walls 12 and 13 of the storage chamber 11, can recognize the RFID tag 30 located in parallel with the bottom surface of the storage chamber 11.

When the RFID readers 20 are slantingly installed as shown in FIG. 1 and FIGS. 2A and 2B, magnetic fluxes are interlinked between the antennas 21 of the RFID readers 20 and the antenna 31 of the RFID tag 30 having a horizontal loop plane differing from conventional RFID readers, which are perpendicularly installed, As described above, in the case that the RFID readers 20 are slantingly installed in the side and rear walls 12 and 13 of the storage chamber 11, it is possible to recognize the RFID tag 30, the antenna 31 of which has a vertical or horizontal loop plane, only using the RFID readers 20 installed in the side or rear walls 12 and 13 of the storage chamber 11. Further, even when the RFID tag 30 is located in any direction in the storage chamber 11, at least one of the RFID readers 20 installed in the side walls 12 or the rear wall 13 of the storage chamber 11 can recognize the RFID tag 30. Accordingly, it is unnecessary to additionally install other RFID readers 20 in the upper and lower walls of the storage chamber 11.

Figure 4:
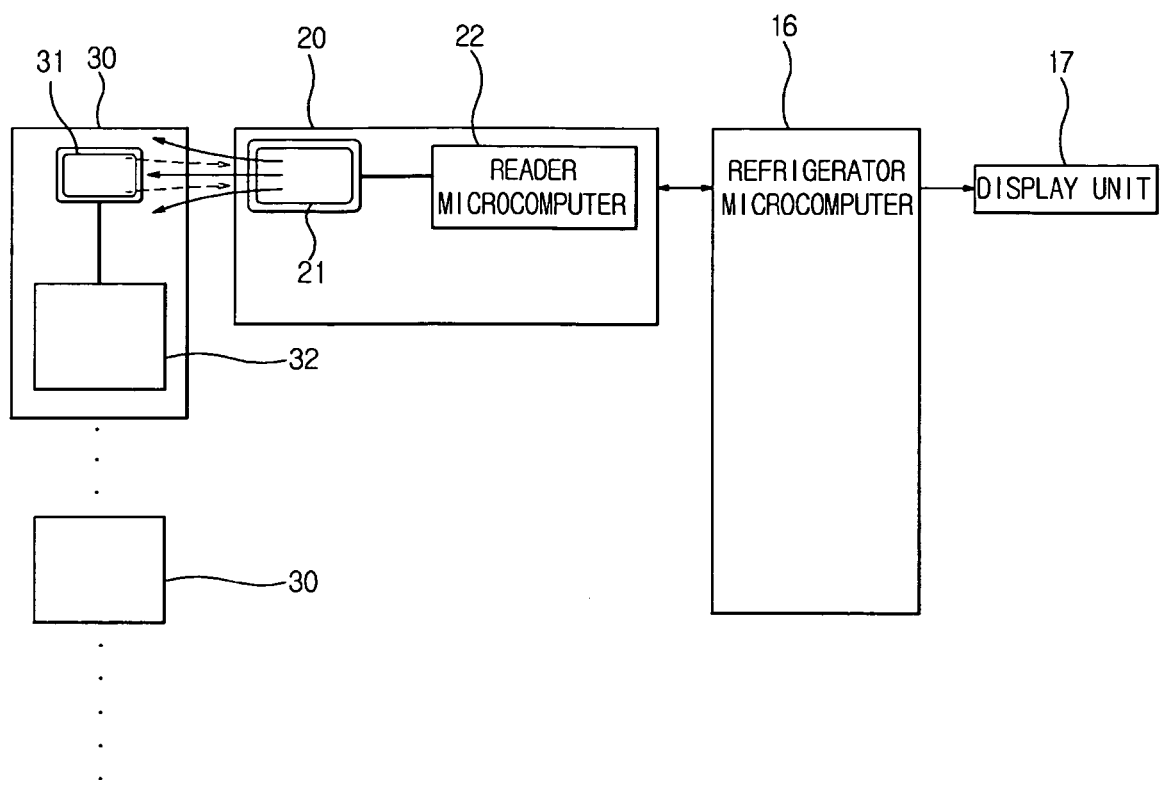
FIG. 4 is a block diagram of the refrigerator of FIG. 1.

As shown in FIG. 4, in addition to the above-described elements, the refrigerator of FIG. 1 further comprises a refrigerator microcomputer 16 for controlling the operation of the refrigerator, and a display unit 17 for displaying kinds and quantity of foods stored in the refrigerator, and the number of days of storing foods, or displaying an operating state of the refrigerator.

Further, each of the RFID readers 20 includes a reader microcomputer 22 connected to the antenna 21. The reader microcomputer 22 analyzes identification (ID) or data of the RFID tag 30 by sending an RF signal or receiving an RF signal transmitted from the RFID tag 30 according to a firmware algorithm, and communicates with the refrigerator microcomputer 16. Although not shown in FIGS. 1 to 4, each of the RFID readers 20 further includes a tuning circuit for transmitting the RF signal, and an RF carrier generator.

Hereinafter, operation of the refrigerator having improved recognition rate of RFID tags in accordance with an exemplary embodiment of the present invention will be described.

During the operation of the refrigerator, the reader microcomputer 22 transmits current to the antennas 21 of the RFID readers 20 every cycle, thereby forming a magnetic field in the storage chamber 11. The magnetic field generates current to the antenna 31 of the RFID tag 30, thereby supplying energy to the RFID tag 30 (only when the RFID tag is a passive tag). A tag chip 32, which is activated by the energy, transmits the ID and data of the RFID tag 30, attached to food, to the RFID readers 20. Preferably, but not necessarily, the RFID readers 20 are designed such that although a plurality of the RFID readers 20 simultaneously recognize the RFID tag 30, the RFID readers 20 can recognize the RFID tag 30 by means of an anti-collision function.

The reader microcomputers 22 analyze the ID and data transmitted from the RFID tag 30, and transmit the analyzed data to the refrigerator microcomputer 16. The refrigerator microcomputer 16 changes the display of the display unit 17 according to the data transmitted from the RFID readers 22. For example, in the case that food is additionally supplied to the inside of the storage chamber 11, an RFID tag 30 attached to the newly supplied food transmits its ID and data to the RFID readers 20, and the RFID readers 20 analyze the ID and data and transmit the analyzed data to the refrigerator microcomputer 16. Then, the refrigerator microcomputer 16 confirms the newly supplied food through the analyzed data, and changes the total number of foods, displayed by the display unit 17, to a new total number incremented by the number of the added food.

As apparent from the above description, the present invention provides a refrigerator having improved recognition rate of RFID tags, in which antennas of RFID readers are slantingly installed in side and rear walls of storage chambers. Thereby, it is possible to recognize all of RFID tags attached to foods stored in the storage chambers without installing the RFID readers in upper and lower walls of the storage chambers.

Although an exemplary embodiment of the invention has been shown and described, it will be appreciated by those skilled in the art that changes may be made in this embodi-

What is claimed is:

1. A refrigerator having an improved recognition rate of RFID tags, comprising:
   storage chambers; and
   a plurality of RFID readers, each of which includes an antenna, for receiving data from the RFID tags attached to goods stored in the storage chambers,
   wherein the antennas of the RFID readers are installed completely within walls of the storage chambers such that the antennas slant with respect to the walls at a designated angle.

2. The refrigerator as set forth in claim 1,
   wherein slanting directions of the antennas differ according to the walls in which the RFID readers are installed.

3. The refrigerator as set forth in claim 1,
   wherein the antennas have coiled shapes, and loop planes of the antennas of the RFID readers installed in the side walls of the storage chambers slant in a longitudinal direction.

4. The refrigerator as set forth in claim 1,
   wherein the antennas have coiled shapes, and loop planes of the antennas of the RFID readers installed in the rear walls of the storage chambers slant in a transverse direction.

5. A refrigerator having an improved recognition rate of RFID tags, comprising:
   storage chambers; and
   first RFID readers installed completely within side walls of the storage chambers for receiving data from the RFID tags attached to goods stored in the storage chambers; and
   second RFID readers installed completely within rear walls of the storage chambers for receiving data from the RFID tags attached to the goods stored in the storage chambers,
   wherein loop planes of antennas of the first RFID readers slant in a longitudinal direction, and loop planes of antennas of second RFID readers slant in a transverse direction.

* * * * *